(12) United States Patent
Weber et al.

(10) Patent No.: US 9,394,835 B2
(45) Date of Patent: Jul. 19, 2016

(54) FOUR-CYLINDER IN-LINE ENGINE WITH PARTIAL SHUTDOWN AND METHOD FOR OPERATING SUCH A FOUR-CYLINDER IN-LINE ENGINE

(71) Applicant: Ford Global Technologies, LLC, Dearborn, MI (US)

(72) Inventors: Carsten Weber, Leverkusen (DE); Martin Wirth, Remscheid (DE); Rainer Friedfeldt, Huerth (DE); Guenter Bartsch, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 13/967,993

(22) Filed: Aug. 15, 2013

(65) Prior Publication Data
US 2014/0053806 A1    Feb. 27, 2014

(30) Foreign Application Priority Data
Aug. 23, 2012  (DE) .......................... 10 2012 214 967

(51) Int. Cl.
*F02D 17/02*    (2006.01)
(52) U.S. Cl.
CPC ....................... *F02D 17/02* (2013.01)
(58) Field of Classification Search
CPC ........... F02D 1/00; F02D 13/06; F02D 17/02; F02D 41/0082; F02D 41/0085; F02D 41/0087; F02D 41/22; F02D 41/30; Y02T 10/123
USPC ...... 123/179.4, 198 DB, 198 DC, 198 F, 295, 123/436, 481, 492; 701/112, 113
See application file for complete search history.

(56) References Cited

U.S. PATENT DOCUMENTS

| | | | | |
|---|---|---|---|---|
| 6,336,440 B1 * | 1/2002 | Schmitz | ..................... | F01L 9/04 123/406.14 |
| 2008/0257300 A1 * | 10/2008 | Lyon | ....................... | F02D 13/06 123/198 F |
| 2012/0055444 A1 * | 3/2012 | Tobergte | .................. | F02D 13/06 123/294 |
| 2013/0199466 A1 | 8/2013 | Friedfeldt et al. | | |
| 2013/0276759 A1 * | 10/2013 | Springer | .................. | F02B 75/04 123/48 R |
| 2013/0333663 A1 * | 12/2013 | Chen | ........................ | F02D 17/02 123/334 |
| 2014/0014062 A1 * | 1/2014 | Yacoub | .................. | F02B 17/005 123/295 |
| 2014/0261315 A1 * | 9/2014 | Willard | ................... | F02D 17/02 123/349 |
| 2015/0128917 A1 * | 5/2015 | Surnilla | .............. | F02D 41/0087 123/568.16 |

FOREIGN PATENT DOCUMENTS

DE   19619969 A1   11/1997
WO   2006032886 A2   3/2006

OTHER PUBLICATIONS

Anonymous, "Cylinder Disablement," IPCOM No. 000157650, Published Aug. 30, 2007, 2 pages.

* cited by examiner

*Primary Examiner* — John Kwon
*Assistant Examiner* — Johnny H Hoang
(74) *Attorney, Agent, or Firm* — Julia Voutyras; Alleman Hall McCoy Russell & Tuttle LLP (57) ABSTRACT

An engine method, comprising turning off a second cylinder group in response to engine load falling below a first threshold, the second cylinder group including a first outer most cylinder and its immediately adjacent cylinder and turning on the second cylinder group in response to engine load raising above a second threshold and operating a first cylinder group constantly throughout engine operation; the first cylinder group including a second outer most cylinder and its immediately adjacent cylinder. By this method, engine efficiency may increase during partial load operating conditions from low engine loads.

8 Claims, 5 Drawing Sheets

FOUR-CYLINDER IN-LINE ENGINE WITH PARTIAL SHUTDOWN AND METHOD FOR OPERATING SUCH A FOUR-CYLINDER IN-LINE ENGINE

CROSS REFERENCE TO RELATED APPLICATIONS

This patent application claims priority to German Patent Application 102012214967.8, filed Aug. 23, 2012, the entire contents of which are hereby incorporated by reference for all purposes.

BACKGROUND AND SUMMARY

Engine fuel consumption during specific load ranges can be reduced by shutting down a number of engine cylinders, called part-load operation.

The efficiency of a petrol engine during part-load operation can be perceptibly increased by partial engine shutdown. At a constant engine power, switching off one cylinder of a multi-cylinder engine increases the load on the other cylinders still in operation. Thus a throttle valve arranged in the intake system may be opened further to introduce a larger air mass into these cylinders to achieve de-choking of the internal combustion engine. The cylinders that remain in operation during the partial shutdown may thus operate in a higher load range, reducing fuel consumption. Thus, the collective load may be shifted towards higher loads.

Because of the greater air mass supplied during partial shutdown, the cylinders which are still in operation may also have a more homogenous mixture formation and tolerate higher exhaust gas recirculation rates.

Further efficiency advantages arise from the absence of combustion because a cylinder which is switched off may not generate wall heat losses resulting from a heat transmission from the combustion gasses to the combustion chamber walls.

Due to high emission quality regulations, diesel engines (auto-ignition engines) may have a higher efficiency or lower fuel consumption than petrol engines in which the load may be set via quantity regulation by the filling of the cylinders with fresh mixture. However, in diesel engines the fuel consumption may still be reduced partial shutdown in specific load ranges. Thus, the statements made above in connection with petrol engines apply accordingly to diesel engines.

The multi-cylinder engines with partial shutdown described in the prior art and the associated methods for operating these engines however have significant efficiency losses. In previously disclosed embodiments using partial shutdown during low load operation, cylinders may be grouped into two operating groups such that, during partial shutdown, one of the groups is shut down and the other remains operational. Prior embodiments have cylinder groups in which the two outermost cylinders form one group and the two innermost cylinders another group. In systems utilizing grouped merging of the exhaust gas lines, the exhaust manifolds formed are arranged adjacent to each other along the longitudinal axis of the cylinder head.

However, the inventors found a number of advantages in grouping the cylinder into groups based on cylinder proximity. In a disclosed embodiment, the four cylinders may be configured such that an outermost cylinder and the adjacent innermost cylinder form a group. Further, the cylinders of a second cylinder group may be cylinders which can be switched on in response to engine load, the cylinders of the first cylinder group may be permanently operated cylinders when the engine is in operation.

By grouping cylinders in this manner, an exhaust system and crankshaft could be optimized to separate mutual influence of exhaust during charge change by separating the exhaust of conflicting cylinders having small crank angle (CA) separation. Further, heat may be efficiently preserved in engines during partial shutdown to allow for faster warm up during all-cylinder engine operation and spray oil cooling may be readily suspended to non-operating cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In the context of the present disclosure, the term engine may refer to petrol engines, diesel engines, or hybrid combustion engines defined as combustion engines which are operated with a hybrid combustion process.

Figure 1:
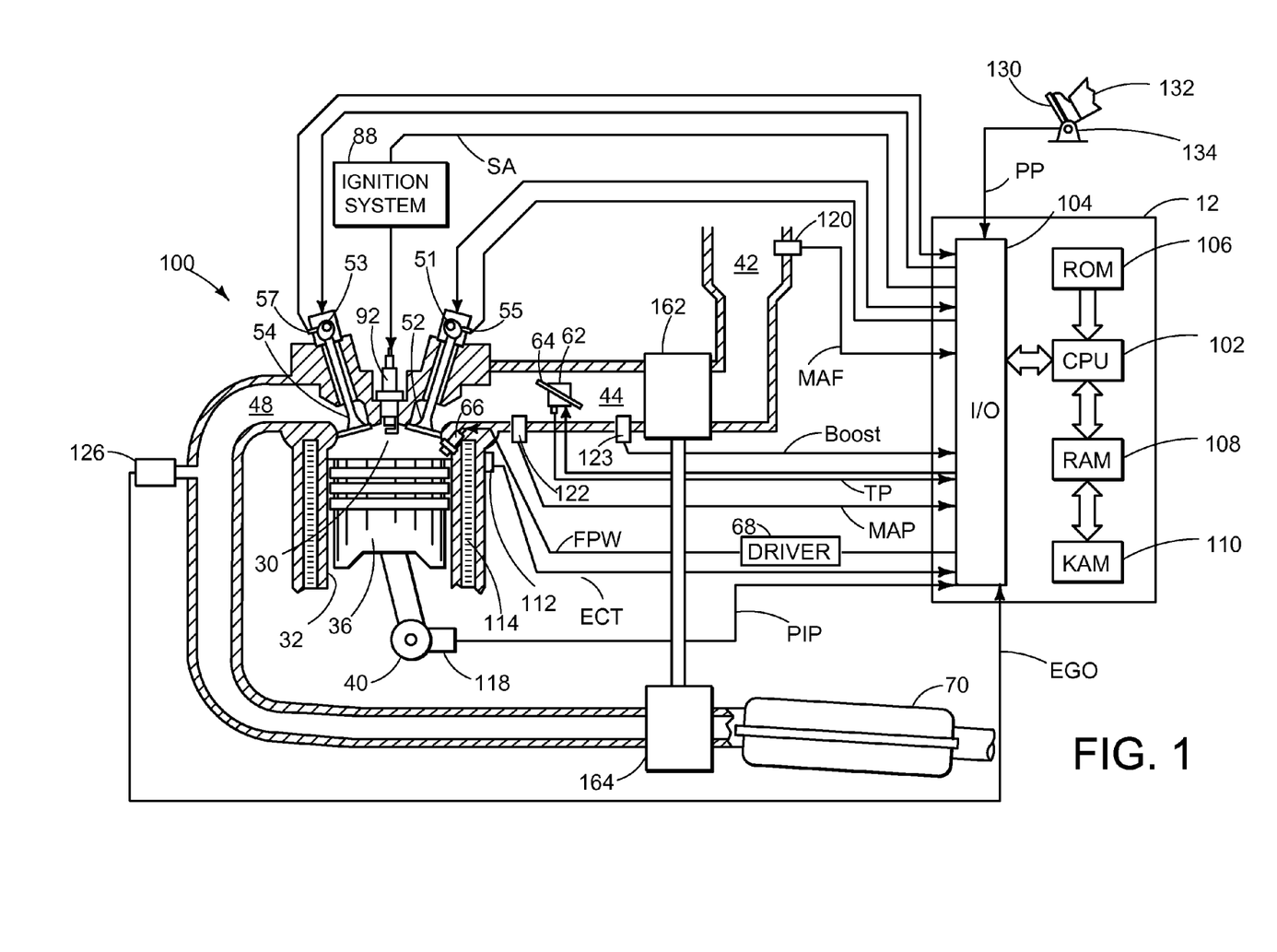
FIG. 1 depicts an example embodiment of an engine system.

FIG. 1 is a schematic diagram showing one cylinder of multi-cylinder engine 100, which may be included in a propulsion system of an automobile. Engine 100 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (combustion chamber) 30 of engine 100 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 100.

Cylinder 1 may receive intake air from intake manifold 44 via intake passage 42 and may exhaust combustion gases via exhaust passage 48. Intake manifold 44 and exhaust passage 48 can selectively communicate with cylinder 1 via respective intake valve 52 and exhaust valve 54. In some embodiments, cylinder 1 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 1 may alternatively include an intake valve controlled via electric valve actuation and an exhaust valve controlled via cam actuation including CPS and/or VCT systems.

Fuel injector 66 is shown coupled directly to cylinder 1 for injecting fuel directly therein in proportion to the pulse width of signal FPW received from controller 12 via electronic driver 68. In this manner, fuel injector 66 provides what is known as direct injection of fuel into cylinder 1. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, cylinder 1 may alternatively or additionally include a fuel injector arranged in intake passage 42 in a configuration that provides what is known as port injection of fuel into the intake port upstream of cylinder 1.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to cylinder 1 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to cylinder 1 via spark plug 92 in response to spark advance signal SA from controller 12, under select operating modes. Though spark ignition components are shown, in some embodiments, cylinder 1 or one or more other combustion chambers of engine 100 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 100, emission control device 70 may be periodically reset by operating at least one cylinder of the engine within a particular air/fuel ratio.

Engine 100 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. One or more of a wastegate and a compressor bypass valve may also be included to control flow through the turbine and compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, a sensor 123 may be disposed in intake manifold 44 for providing a BOOST signal to controller 12.

Figure 4:
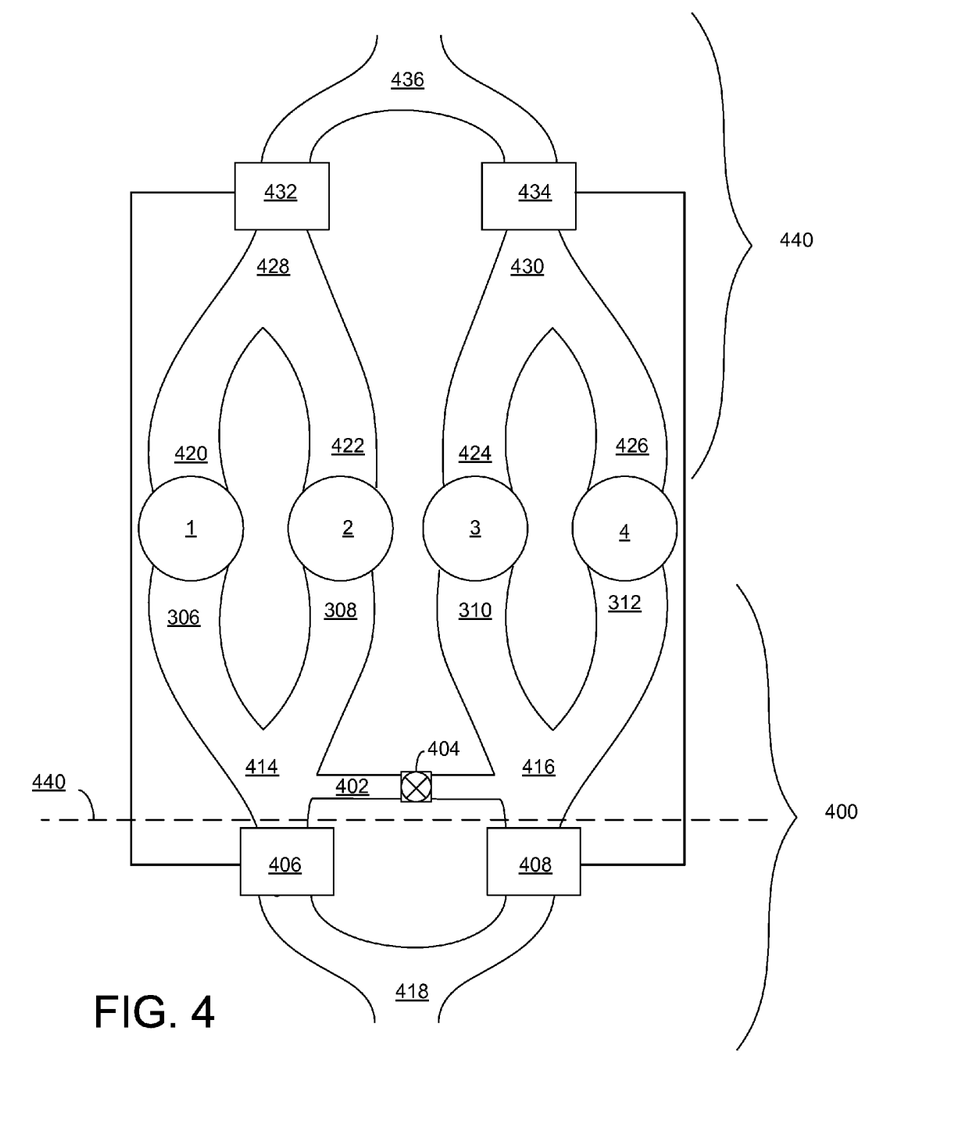
FIG. 4 depicts an example embodiment of an exhaust manifold and intake manifold.

Controller 12 is shown in FIG. 4 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 100, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft.

Storage medium read-only memory 106 can be programmed with computer readable data representing instructions executable by processor 102 for performing the methods described below as well as other variants that are anticipated but not specifically listed.

Figure 2:
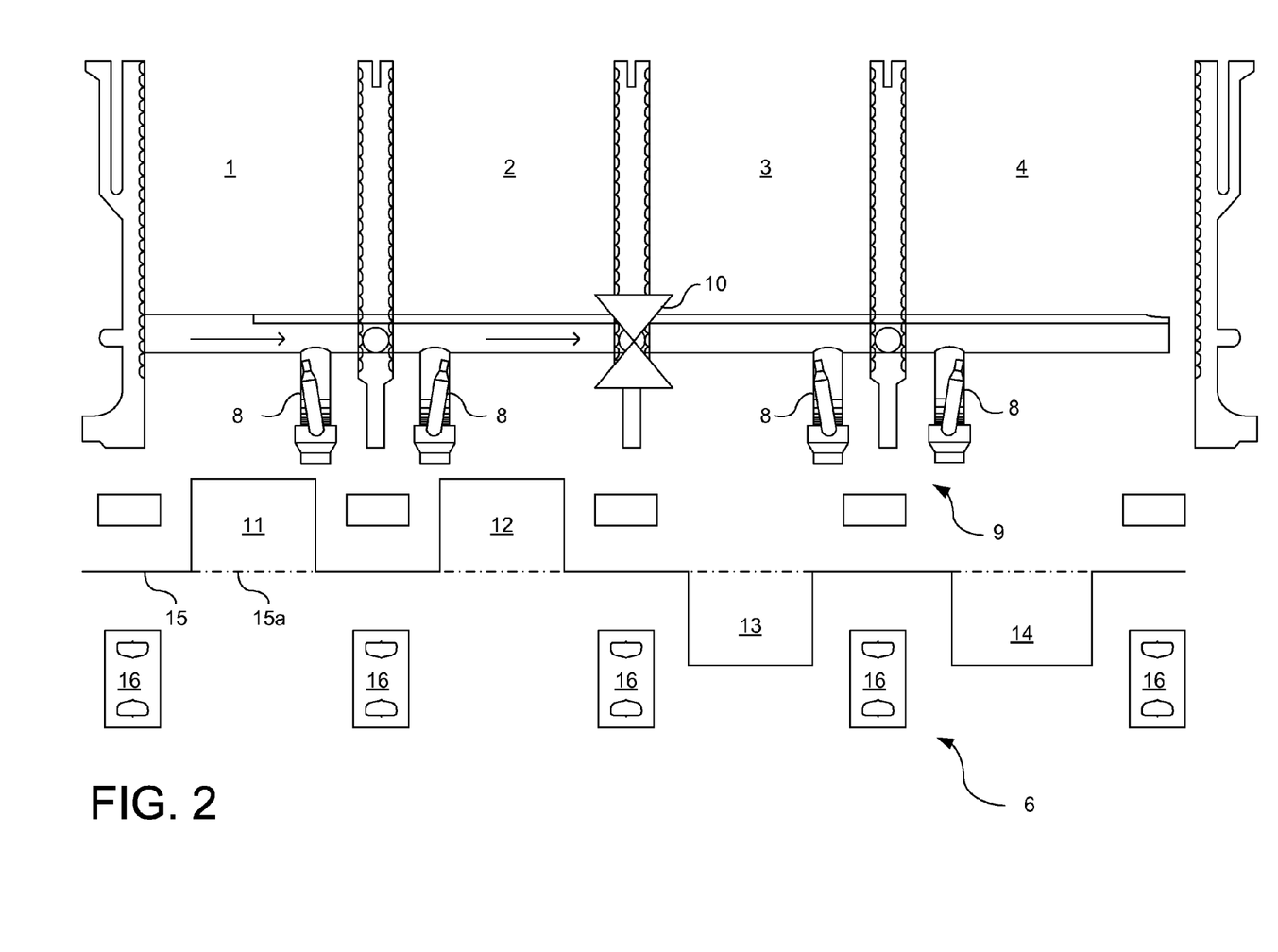
FIG. 2 schematically depicts an example embodiment of engine and crankshaft system.

Combustion engines may include a cylinder head and a cylinder block which are connected together at their mounting faces to form the individual cylinders or combustion chambers. FIG. 2 diagramatically depicts an embodiment of a four cylinder combustion engine in accordance with the disclosure. Cylinder 1, 2, 3, and 4 may each be embodiments of cylinder 1 as depicted in FIG. 1.

The cylinder head may serve to accommodate the valve gear (not shown). The object of the valve gear may be to open and close the inlet and exhaust openings of the cylinders at the desired times.

To accommodate the four pistons 36 and the four cylinder tubes, the cylinder block may have a corresponding number of cylinder bores. The piston 36 of each engine cylinder may be guided axially moveably in a cylinder tube, and together with the cylinder tube and the cylinder head, may delimit the combustion chamber of a cylinder. Here, the piston floor may form part of the combustion chamber inner wall which, together with the piston rings, seals the combustion chamber against the cylinder block or crankcase. Thus combustion gases and combustion air is prevented from entering the crankcase and oil prevented from entering the combustion chamber.

The piston 36 transmits the gas forces generated by the combustion to the crankshaft 15. For this, the piston 36 is connected via a piston bolt to a conrod, which is itself mounted moveably on the crankshaft, namely on a crankshaft throw.

The crankshaft 15 mounted in the crankcase may receive the conrod forces which are composed of the gas forces resulting from the fuel combustion in the combustion chamber and mass forces resulting from the uneven movement of the drive gear parts. The oscillating stroke movement of the pistons 36 may be transformed into a rotational motion of the crankshaft. The crankshaft transmits the torque to the drive train. Part of the energy transmitted to the crankshaft 15 may be used to drive ancillary devices such as the oil pump and/or the alternator, and/or may serve to drive a camshaft and hence activate a valve gear.

The upper crankcase half may be formed by the cylinder block. The crankcase may be completed by a lower crankcase half which can be mounted on the upper crankcase half and serve as an oil pan.

To receive and mount the crankshaft 15, two or more bearings 16 may be provided in the crankcase which may be formed in two parts and each comprise a bearing saddle and a bearing cover which can be connected to the bearing saddle. The crankshaft may be mounted in the region of the crankshaft journals, which may be arranged spaced apart along the longitudinal axis of the crankshaft and formed as thickened shaft shoulders. In some embodiments, bearing covers and bearing saddles may be formed as separate components or integral within crankcase and the crankcase halves. Bearing shells may be arranged as intermediate elements between the crankshaft 15 and the bearings 16.

In the mounted state, each bearing saddle may be connected to the corresponding bearing cover. In each case, a bearing saddle and a bearing cover—where applicable in cooperation with bearing shells as intermediate elements—form a bore to receive a crankshaft journal. The bores may be supplied with engine oil or lubricating oil so that a load-bearing lubricant film—in the manner of a plain bearing—is formed between the inner face of each bore and the associated crankshaft journal when the crankshaft rotates. Alternatively a bearing can also be formed as one piece, for example when the crankshaft 15 is fitted.

To supply the bearings with oil, a pump may be provided for delivering engine oil to the at least two bearings, wherein the pump supplies engine oil via the oil circuit to a main oil gallery from which channels lead to bearings 16. To form the main oil gallery, a main supply line 7 may be provided in the cylinder block, oriented along the longitudinal axis 15*a* of the crankshaft.

In the prior embodiments, the pump is supplied with engine oil from an oil pan via a suction line leading from the oil pan to the pump, to induce a sufficiently high delivery volume and a sufficiently high oil pressure in the oil circuit, in particular in the main oil gallery. The conrod bearings, the bearings of a balancer shaft, or bearings not otherwise mentioned may be similarly supplied with oil.

Spray oil cooling 9 of the pistons 36, as provided in the engine may also be supplied with oil. For this the oil pump may deliver oil, starting from an external cylinder, into a supply line oriented along the longitudinal axis 15*a* of the crankshaft 15. Nozzles may be arranged along the supply line, spaced apart in the flow direction, and may spray the floors of the pistons with engine oil from below and on the crankcase side for cooling.

The friction within the bearings supplied with oil, for example the crankshaft bearings, may depend on the viscosity and hence on the temperature of the oil supplied, and may contribute to the fuel consumption of the engine.

Reducing friction losses for more efficient combustion may reduce fuel consumption, which in turn contributes to reducing pollutant emissions. Thus oil may be provided to the bearing to reduce power losses from friction. Rapid heating of the engine oil and rapid heating of the engine, in particular after a cold start, may further reduce power losses from friction and increase combustion efficiency. Rapid heating of the engine oil during the warm-up phase of the engine ensures a correspondingly rapid reduction in viscosity and hence a reduction in friction or friction power.

Another method of reducing fuel consumption is to shut down the cylinders by switching off individual cylinders during specific load ranges.

The efficiency of a petrol engine during part-load operation can be perceptibly increased by partial engine shutdown. At a constant engine power, switching off one cylinder of a multi-cylinder engine increases the load on the other cylinders still in operation. Thus a throttle valve arranged in the intake system may be opened further to introduce a larger air mass into these cylinders to achieve de-choking of the engine. The cylinders that remain in operation during the partial shutdown may thus be operated in a higher load range at which the specific fuel consumption is lower. Thus, the load collective may be shifted towards higher loads.

Because of the greater air mass supplied during partial shutdown, the cylinders remaining in operation may also have more homogenous mixture formation and tolerate higher exhaust gas recirculation rates.

Further efficiency advantages arise from the absence of combustion because a cylinder which is switched off may not generate wall heat losses resulting from a heat transmission from the combustion gasses to the combustion chamber walls.

Due to high emission quality regulations, diesel engines (auto-ignition engines) may have a higher efficiency or lower fuel consumption than petrol engines in which the load may be set by means of quantity regulation via the filling of the cylinders with fresh air mixtures. However, in diesel engines the fuel consumption may still be reduced by means of partial shutdown by switching off individual cylinders in specific load ranges. Thus, the statements made above in connection with petrol engines apply accordingly to diesel engines.

A disclosed engine embodiment may have cylinder shutdown. For example, in a four cylinder engine such as that shown in FIG. 2, the four cylinders 1, 2, 3 4 may be configured so that they form two groups each of two cylinders, wherein the cylinders of a second cylinder group may be cylinders which can be switched off in response to engine load, the cylinders of the first cylinder group may be permanently operated cylinders when the engine is in operation.

The four cylinders may be configured such that an outermost cylinder and the adjacent innermost cylinder form a group. The cylinders of one cylinder group may be formed as cylinders of a second group which can be switched off in response to engine load, wherein the first group continues to operate on partial shutdown. This may be advantageous compared a cylinder grouping in which the two outermost cylinders and the two innermost cylinders each form a group. In systems utilizing grouped merging of the exhaust gas lines, the exhaust manifolds formed are arranged next to each other (adjacent to each other) along the longitudinal axis of the cylinder head.

In FIG. 2, the four cylinders 1, 2, 3, 4 arranged in-line are configured such that they form two groups each of two cylinders 1, 2 and 3, 4, wherein the first two cylinders 1, 2 form a first cylinder group of permanently operated cylinders 1, 2 when the engine is in operation. The other two cylinders 3, 4 form the second group which includes the group of cylinders 3, 4 which can be switched on load-dependently and which are switched off when the load falls below a pre-definable load threshold as part of a partial shutdown.

The crankshaft 15 belongs to a crank drive, is mounted in the cylinder block 6, may include five bearings 16 and for each cylinder 1, 2, 3, 4, and a crankshaft throw 11, 12, 13, 14 associated with the cylinder 1, 2, 3, 4. The crankshaft throws 11, 12, 13, 14 are arranged spaced apart along the longitudinal axis 15*a* of the crankshaft 15, wherein the two crankshaft throws 11, 12, 13, 14 of the two cylinders 1, 2, 3, 4 of each cylinder group have no offset in the circumferential direction about the longitudinal axis 15*a* of the crankshaft 15, so that the cylinders 1, 2 of the first cylinder group and the cylinders 3, 4 of the second cylinder group are mechanically synchronous. The crankshaft throws 11, 12 of the first two cylinders 1, 2, (the first cylinder group), are arranged on the crankshaft 15 offset in the circumferential direction by 180° in relation to the crankshaft throws 13, 14 of the third and fourth cylinders 3, 4 (the second cylinder group). A piston associated with the cylinders 1, 2, 3, 4 is mounted on each crankshaft throw 11, 12, 13, 14 via a conrod (not shown).

A spray oil cooling 9 which wets the piston floor of each piston with engine oil for cooling, oil is supplied via a supply line 7. The supply line 7 of the spray oil cooling 9 may be oriented along the longitudinal axis 15*a* of the crankshaft 15, wherein cylinder-specific supply channels 8 are provided for each of the four cylinders 1, 2, 3, 4.

A shut-off element 10 may be arranged the supply line 7 between the two innermost cylinders 2, 3 such that the spray oil cooling 9 of the two cylinders 3, 4 can be switched on load-dependently and can be switched off on partial shutdown by closing the supply line 7.

In turbocharged systems, the turbines may be arranged more closely to the cylinder head to achieve greater construction efficiency in an embodiment of the disclosed system. This is because in prior approaches the two exhaust manifolds may be least partly above each other in the cylinder head, thus cylinder head may have a correspondingly large construction height. Because the two exhaust manifolds emerge from the cylinder head at different distances from the mounting face of the cylinder head (i.e. different heights). The connection and arrangement of an exhaust turbocharging may therefore be difficult because of the usually small mutual spacing of the manifolds. However, in a disclosed embodiment, the two exhaust manifolds emerge from the cylinder head evenly spaced from the mounting face of the cylinder head (i.e. at the same height), thus a low height cylinder head may be constructed allowing for a more condensed packing of the engine bay.

A disclosed embodiment may also allow the spray oil cooling of the switchable cylinders 3, 4 to be switched off on partial shutdown by means of a single shut-off element. In the supply line 7 for the spray oil cooling 9 between the two innermost cylinders 2,3, a shut-off element may be provided with which the supply line 7 is or can be closed on partial shutdown, whereby the spray oil cooling of the switchable cylinders 3,4 can be switched off.

In conventional cylinder grouping, two shut-off elements may be required to deactivate the spray oil cooling of the cylinders switched off during partial shutdown. Thus a shut-off element may be provided on the nozzle of each switchable cylinder or in the associated cylinder-specific supply channel to separately deactivate the spray oil cooling associated with a cylinder that may be switched off.

By deactivating the spray oil cooling on partial shutdown, the friction in the engine is reduced. In particular, when a variably controllable oil pump is used as the pump to deliver the engine oil, the power requirement may fall as a result of the partial shutdown. This may also provide a deactivation of the spray oil cooling leading to a further reduction in fuel consumption during the partial shutdown.

The deactivation of the spray oil cooling on partial shutdown, as well as the reduction in fuel consumption, also has the advantage that the pistons of the switched-off cylinders are not cooled unnecessarily during the partial shutdown. Therefore, when the switchable cylinders are re-ignited after the partial shutdown, they may reach their operating temperature more quickly further reducing engine emissions. This may be particularly advantageous in engines in which fuel is frequently injected into the cylinder in the direction of the piston floor, and a recess provided in the piston floor is decisively involved in the mixture formation in the combustion chamber.

Starting from a cylinder numbering as regulated in DIN 73021, according to which the cylinders are counted in-line starting with an outermost cylinder, with a four-cylinder in-line engine the first two cylinders can form the switchable cylinder group but the third and fourth cylinders may also be grouped and formed as switchable cylinders.

Further embodiments of the engine may be advantageous wherein the spray oil cooling 9 is supplied with oil via the supply line 7 starting from an outermost cylinder 1, and the cylinder group which lies downstream along the supply line viewed in the flow direction is the cylinder group 3,4 that may be switched on load-dependently. Thus, the spray oil cooling 9 of the switched-off cylinders can be deactivated easily in that starting from an outermost cylinder 1, with the shut-off element closed, oil may not be delivered further than the middle of the cylinder block and between the two innermost cylinders 2,3. The cylinder group 1,2 which is connected to the supply line is supplied with oil as the second group 3,4 (viewed in the flow direction) forms the cylinder group which can be switched on load-dependently and on partial shutdown is isolated from the remaining oil circuit and oil supply by closure of the shut-off element 10.

In some embodiments, the shut-off element 10 may be a magnetic valve. In principle the shut-off element 10 can be controllable electrically, hydraulically, pneumatically, mechanically or magnetically, by means of engine control.

In some embodiments, two crankshaft throws of the two cylinders of each cylinder group have no offset in the circumferential direction about the longitudinal axis 15*a* of the crankshaft 15 so that the two cylinders of a cylinder group are mechanically synchronous cylinders. Further, the crankshaft throws 11, 12 of the one cylinder group may be arranged on the crankshaft twisted in the circumferential direction by 180° about the longitudinal axis in relation to the crankshaft throws of the other cylinder group 13,14.

To reduce the mutual obstruction and influence that cylinders of one group exert on another during load change, the four cylinders may be operated such that the cylinders of one cylinder group have the maximum offset with regard to the work processes. For example, combustion may be initiated alternately on one cylinder of the first cylinder group and one cylinder of the second cylinder group by means of external ignition. Process variants may ignite cylinders in the sequence 1-3-2-4 or in the sequence 1-4-2-3.

The cylinders may be ignited at an interval of 180°CA so that, starting from the first cylinder 1, the ignition times measured in °CA may be as follows: 0-180-360-540. Consequently the cylinders of one cylinder group may have a thermodynamic offset of 360°CA. Thus, in embodiment wherein the exhaust valves have an opening duration of between 220°CA and 260°CA, the cylinders of one group may not influence each other on load change with the given ignition sequence. Mutual influence may therefore be reduced or eliminated independently of how soon the exhaust gas lines are merged into a combined exhaust gas line downstream of the exhaust openings.

An ignition sequence deviating from the conventional ignition sequence 1-3-4-2 may also include a crankshaft deviating from the conventional crankshaft and/or a crankshaft throw deviating from the conventional crankshaft throw.

According to the embodiment discussed above, a crankshaft may be mechanically synchronous with cylinders of one cylinder group and may thus pass through the top and bottom dead centers at the same time. The associated crankshaft throws of these two cylinders may have no offset in the circumferential direction about the longitudinal axis 15a of the crankshaft 15. The thermodynamic offset of 360°CA may then be achieved by the ignition sequence.

In order to achieve a respective ignition interval of 180°CA over all the four cylinders, 1,2,3,4 the crankshaft throws of the one cylinder group may be arranged on the crankshaft 15 twisted in the circumferential direction by 180° in relation to the crankshaft throws of the other cylinder group.

Embodiments may be advantageous in which each cylinder has at least one exhaust opening for discharging the exhaust gasses from the cylinder via an exhaust gas discharge system, and an exhaust gas line is connected to each exhaust opening.

Further embodiments may be advantageous in which each cylinder has two exhaust openings for discharging the exhaust gasses from the cylinder.

To control the load change in four-stroke engines, reciprocating valves are regularly used as control elements which execute an oscillating stroke movement during operation of the engine and in this way open and close the inlet and exhaust openings. During the load change, the combustion gasses are expelled via the exhaust openings of the four cylinders and the combustion chambers are filled by drawing the fresh mixture or charge air into inlet openings. The valve-actuating mechanism used to move the valves, including the valves themselves, is referred to as the valve gear. The task of the valve gear is to open and close the inlet and exhaust openings of the cylinders at a specified time. A rapid opening of maximum flow cross sections may minimize choke losses in the inflowing or outflowing gas flows and maximize a fill of the combustion chamber with fresh mixture and effective expulsion of the combustion gasses. For the reasons above it may be advantageous to equip each cylinder with more than one exhaust opening to provide two exhaust openings per cylinder.

In this context, embodiments may be advantageous in which the exhaust gas lines of the cylinders of each cylinder group merge in each case into a combined exhaust gas line, forming of a separate exhaust manifold. The merging of exhaust gas lines into a combined exhaust gas line is generally, and in the context of the present disclosure, designated the exhaust manifold.

The formation of a separate exhaust manifold for each of the two cylinder groups may help to ensure that the cylinders do not exert a mutual influence and do not obstruct each other on load change. It should be taken into account here that the cylinders of one cylinder group may have a thermodynamic offset of 360°CA wherein the opening duration of the exhaust valves is less than 360°CA. This reference further being made in connection with the crankshaft 15 and crankshaft throws 11,12,13,14.

Furthermore, a grouping usually leads to a shortening of the overall length of all exhaust gas lines and also to a reduction in the mass of the exhaust gas discharge system upstream of any turbines provided in the exhaust gas discharge system. Reducing this mass may reduce the thermal inertia of the relevant portion, and may efficiently utilize the exhaust gas enthalpy on the turbine side, which may itself be partially determined by the pressure and temperature.

The intake lines leading to the inlet openings and the exhaust gas lines connected to the exhaust openings may be partly integrated in the cylinder head. The concrete configuration of the exhaust gas discharge system, namely the manner in which the exhaust gas lines of the four cylinders are merged in the individual case, may depend on the respective objective such as the operating ranges for which the operating behavior of the combustion engine may be optimized, and in particular also on whether the engine is charged by means of exhaust turbocharging.

Figure 3:
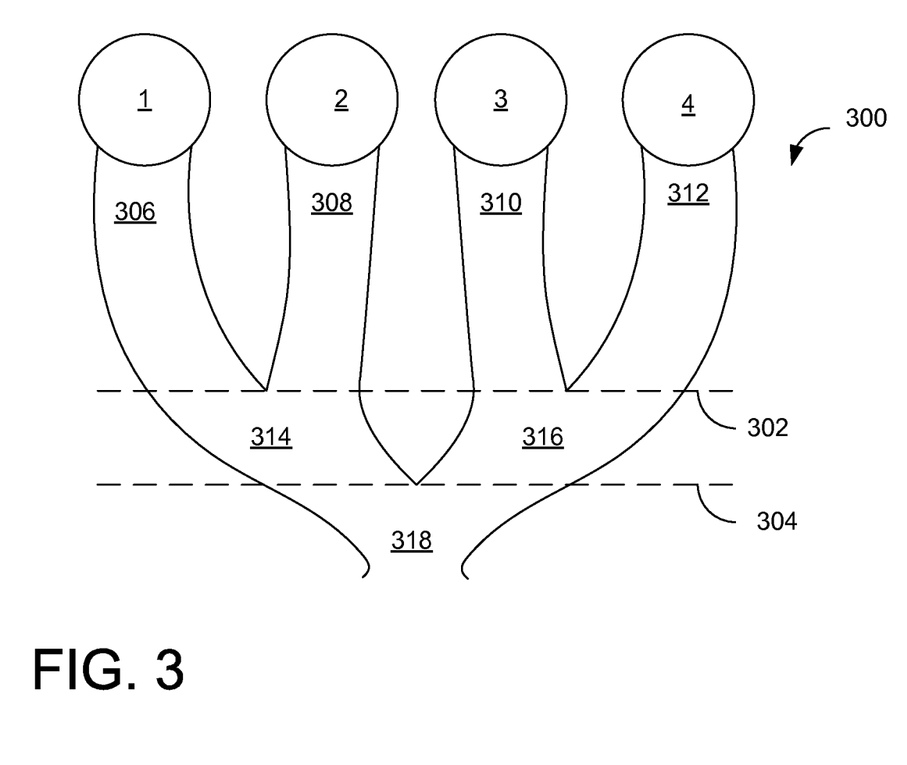
FIG. 3 depicts an example embodiment of an exhaust manifold.

Embodiments of the engine may advantageously have a partially or fully integrated exhaust gas manifold such as that shown in FIG. 3. As shown in FIG. 3, the exhaust gas lines 306, 308,310,312 of the cylinders 1,2,3,4 of each cylinder group merge into a combined exhaust gas pipe 318 in each case within the cylinder head such that the exhaust manifold is integrated into the cylinder head.

Integration of the manifolds may lead to a more compact construction of the engine and a denser packaging of the entire drive unit in the engine bay. Integration may also reduce production and installation costs and engine weight.

The short exhaust gas lines also have an advantageous effect on the arrangement and operation of an exhaust gas after-treatment system, which may be provided downstream of the cylinders. Shortening the path of the hot exhaust gasses to the exhaust gas after-treatment systems so that the exhaust gasses have little time to cool allows the exhaust gas after-treatment systems to reach an operating temperature or start temperature more quickly, in particular after a cold start of the engine. To this extent, it is suitable to minimize the thermal inertia of the portion of the exhaust gas lines between the exhaust openings of the cylinders and an exhaust gas after-treatment system. This can be achieved by reducing the mass and length of this portion by shortening the corresponding exhaust gas lines by means of integration of the manifolds.

For engines charged via exhaust turbochargers, arranging the turbines as close as possible to the outlet and the exhaust openings of the cylinders, makes optimum use of the exhaust gas enthalpy of the hot exhaust gasses and allows rapid response behavior of the turbochargers. Also, the thermal inertia and volume of the line system between the exhaust openings of the cylinders and the respective turbine may be minimized. Shortening the lines by integrating the exhaust manifolds in the cylinder head also helps to achieve this purpose.

Furthermore in liquid-cooled engines, it may be advantageous to integrate the exhaust manifolds in the cylinder head to participate in the cooling provided in the cylinder head to reduce the reliance on cost-intensive thermally heavy duty exhaust manifold materials.

According to the prior art, the integration of an exhaust manifold in the cylinder head frequently leads to the cylinders of the manifold exerting a mutual influence on load change. In embodiments this may be avoided by using a cylinder group that comprises two cylinders and these two cylinders are operated with a thermodynamic offset of 360°CA so that the combustion in the two cylinders of a group is initiated at an interval of 360°CA. Thus cylinder 3 may be operated with a thermodynamic offset of 360°CA from cylinder 4.

A further embodiment of an exhaust gas manifold 400 is shown in FIG. 4. This embodiment may advantageously include at least one turbine 406 and/or 408 of an exhaust turbocharger each arranged in partial combined exhaust gas lines 314 and 316. The turbines used may be fitted with a variable turbine geometry adapted to the respective operating point of the engine by adjustment. The wastegate construction can also be advantageous in this embodiment.

In an exhaust turbocharger, a compressor and a turbine may be arranged on the same shaft. The hot exhaust gas flow supplied to the turbine, expands under energy emission in the turbine and thus causes the shaft of the charger to rotate. The energy emitted by the exhaust gas flow to the turbine and finally to the shaft may help to drive the compressor, also arranged on the shaft, which delivers and compresses the charge air supplied to it, thus charging the cylinders and the engine.

The advantage of the exhaust turbocharger in comparison with a mechanical charger is that no mechanical connection is relied upon to transmit power between the charger and the engine. A mechanical charger draws the energy required for its operation completely from the engine and hence reduces the power supplied and thus has a disadvantageous effect on the efficiency whereas the exhaust turbocharger uses the energy of the hot exhaust gasses.

Charging may increase the power of the engine. A greater air mass may be supplied to each cylinder per work cycle by compressing the air for the combustion process. As a result, the fuel mass and hence the medium pressure is increased. Charging may be a suitable means for increasing the power of an engine with unchanged capacity, or for reducing the capacity with the same power. In each case, charging leads to an increase in space power and to a more favorable volume ratio. Thus the load collective can be shifted towards higher loads at which the specific fuel consumption is lower for the same vehicle peripheral conditions.

Use of a single exhaust turbocharger may achieve a torque drop when the rotation speed falls below a specific level. Thus a plurality of exhaust turbochargers may be provided to increase the torque characteristic of a charged engine, for example several turbochargers or turbines arranged in parallel, as in the embodiment discussed herein.

The exhaust manifold 400 of the engine is configured so that a one exhaust manifold is allocated to the first cylinder group 1,2, with a turbine 406 in the associated combined exhaust gas line 414, and a separate exhaust manifold is allocated to the second cylinder group 3,4, with a second turbine 408 in the associated combined gas line 416. Each of turbines 406 and 408 is exposed to exhaust gas from two cylinders. As a result of the grouping, the exhaust gas volume upstream of each turbine is smaller, increasing the response behavior of the turbines and hence of the turbochargers and the torque characteristic as a whole.

A further advantage of the cylinder grouping according to a disclosed embodiment is that at low loads or rotation speeds and at small exhaust gas quantities, the exhaust lead pulse may be used for pulse charging. Pulse charging may achieve high turbine pressure ratios even at low turbine rotation speeds. In this way, high charge pressure ratios and high boost pressures may be generated with small exhaust gas quantities.

The pressure peaks or exhaust lead pulses may be received in the exhaust gas system to use the dynamic wave processes occurring in the exhaust gas discharge system, in particular the exhaust lead pulses for charging and to increase engine responsiveness and power capacity. Thus it may be advantageous if the pressure fluctuations in the exhaust gas lines reinforce each other and/or do not weaken or counteract each other.

It may be suitable to group the exhaust gas lines or cylinders in such a manner that the high pressures, in particular the exhaust lead pulses of the individual cylinders, are received in the exhaust gas discharge system. In a cylinder head with four cylinders arranged in-line, it may be advantageous in this respect to group together in each case into one cylinder group two cylinders with an ignition interval of 360°CA.

Pulse charging has proved particularly advantageous in accelerating the turbine impeller and in increasing the turbine rotation speed which can fall perceptibly on idling of the engine or at low load, and which often is raised again as quickly as possible by means of the exhaust gas flow on an increased load demand. The inertia of the impeller and the friction in the shaft bearing may delay acceleration of the impeller to higher rotation speeds and hence a direct rise in boost pressure.

Partial shutdown in conjunction with an exhaust turbocharging has further advantages if the cylinders are configured in the manner described above (two cylinder groups each of two cylinders), wherein the exhaust gas lines of each cylinder group are merged separately from the exhaust gas lines of the other cylinder group, forming a separate exhaust manifold, in each case into a separate combined exhaust gas line as shown in FIG. 4.

Turning again to FIG. 3, exhaust lines 306 and 308 from first group cylinders 1,2 may merge to form a first partial combined exhaust line 314 and exhaust lines 310 and 312 from first group cylinders 3,4 may merge to form a second partial combined exhaust line 316 at a first lateral distance from the exhaust openings of the cylinders at 302. The first partial combined exhaust line 314 may then merge with the second partial combined exhaust line 316 at a second lateral distance from the exhaust openings of the cylinders at 304 to form combined exhaust pipe 318. The first distance 302 may be nearer to the exhaust openings of the cylinders than the second distance 304.

A cylinder head may have an outer wall located at 302 such that four separate exhaust passages emerge. A fully integrated exhaust manifold may have an outer wall at 304 so that a single combined exhaust passage emerges from the cylinder head. A partially integrated manifold may have an outer wall at a lateral distance from exhaust cylinder openings between that of 302 and 304. In this example two exhaust passages may emerge from the cylinder head, specifically first partial combined exhaust line 314 and second partial combined exhaust line 316. Partial combined exhaust passages 314 and 316 may then merge outside of the cylinder head such that exhaust gas from first cylinder group 1, 2 is isolated from exhaust gas from second cylinder group 3,4 until a point outside of the cylinder head.

If in part-load operation of the engine, the second cylinder group 3,4 may be switched off and the charge air mass supplied to the first cylinder group 1, 2, and hence the exhaust gas quantity discharged from this cylinder group 1,2 as part of the load change, may be increased. For this reason, in part-load operation of the engine, more exhaust gas allocated to the first cylinder group may be supplied to a first turbine. As a result, the operating behavior of the charger and hence engine behavior may exhibit increased efficiency and responsiveness.

The embodiment of FIG. 4 may advantageously merge exhaust gas lines of the two cylinder groups 1, 2 and 3, 4 into a common exhaust gas line 418 downstream of one or more turbines 406 and 408.

Merging the combined exhaust gas lines 414 and 416 reduces the overall length of the exhaust gas lines and also has advantages with regard to exhaust gas after-treatment, as all the exhaust gas can be treated as part of a common exhaust gas after-treatment.

Further embodiments of the engine may be externally-ignited. Because of the quantity regulation in petrol engines there is a greater demand for designs to increase efficiency, which is why an externally-ignited engine is particularly suitable to be configured according to a disclosed embodiment.

Embodiments of the engine may be advantageous wherein the exhaust manifolds of the two cylinder groups 1,2 and 3,4 are be connected to each other upstream of the turbines 406 and 408 via a connecting line 402, wherein a shut-off element 404 is arranged in the connecting line 402.

The exhaust gas volume upstream of a turbine can then be varied for different operating conditions of the engine, in particular different quantities of exhaust gas. For example, to receive the exhaust lead pulses for pulse charging with small exhaust gas quantities, it has proved advantageous to keep the two exhaust manifolds separate from each other by closing the shut-off element 404 in the connecting line 402.

In order, however, to be able to operate optimally a turbine provided downstream of the cylinders in the exhaust gas discharge system at large exhaust gas quantities, the turbine may be exposed to as constant an exhaust gas flow as possible, for which reason under these operating conditions, a virtually unchanging pressure upstream of the turbine is preferred in order to achieve a so-called accumulation charge.

The pressure pulses in the exhaust gas lines can be smoothed out by a correspondingly large exhaust gas volume upstream of the turbine. To this extent, connecting the exhaust manifolds of the two cylinder groups upstream of the turbines via a connecting line can be advantageous for larger exhaust gas quantities.

In some embodiments of the charged engine, each cylinder may have at least one inlet opening for the supply of charge air via an intake system and an intake line connected to each inlet opening, wherein the intake lines of the cylinders of each cylinder group merge in each case into a combined intake line, forming an intake manifold, and at least one compressor of an exhaust turbocharger is arranged in each combined intake line.

If the cylinders are grouped in the manner disclosed herein, and the exhaust manifolds of the two groups are configured in the manner above, it may be advantageous to form the intake system corresponding to the exhaust system. In such a configuration the advantages achieved on the exhaust gas side can be optimally utilized to generate sufficiently high turbine pressure ratio on the inlet side and to produce a satisfactory boost pressure via the two compressors.

For the reasons given above embodiments of the engine may be advantageous wherein each cylinder has two inlet openings for the supply of charge air via an intake system.

Returning again to FIG. 4 an intake manifold 440 is shown in accordance with the embodiment described above. Cylinders 1,2,3,4 have intake inlets 420,422,424,426 respectively. First cylinder group 1,2 has inlets 420, 422 that merge to form a first partial combined intake pipe 428. Second cylinder group 3,4 has inlets 424, 426 that merge to form a second partial combined intake pipe 430. First combined intake pipe 428 has a compressor 432 that may be coupled to turbine 406; second combined intake pipe 430 has a compressor 434 that may be coupled to turbine 408.

Further engine embodiments may be fitted with a liquid cooling system integrated partially into the cylinder head, here the cylinder head may be fitted with at least one integrated coolant jacket to form the liquid cooling.

In particular, charged engines may be subjected to very high thermal loads, thus higher demands may be imposed on the cooling. With liquid cooling, large heat quantities can be dissipated.

Engines with integrated liquid cooling may include a cylinder head or cylinder block to be fitted with an integrated coolant jacket such that the arrangement of coolant channels carries the coolant through the cylinder head or cylinder block so that heat is emitted to the coolant inside the component. The coolant here may be delivered via a pump arranged in the cooling circuit so that it circulates in the coolant jacket. The heat emitted to the coolant may therefore be discharged from the inside of the head or block and extracted again from the coolant in a heat exchanger.

The initiation of combustion can take place both via external ignition, for example by a spark plug, auto-ignition, or compression ignition. To this extent the method can be applied to petrol engines but also to diesel engines and hybrid combustion engines.

The engine may be operated by a method wherein combustion in the cylinders is initiated at an interval of 180°CA.

Method variants may be advantageous wherein combustion in the cylinders is initiated in the sequence 1-3-2-4 and at an interval of 180°CA, wherein the cylinders are counted and numbered starting with an outermost cylinder in-line along the longitudinal axis of the cylinder head. Other method variants may have cylinder combustion initiated in the sequence 1-4-2-3 and at an interval of 180°CA.

For engines in which the cylinders are equipped with ignition devices to initiate external ignition, method variants are advantageous in which the cylinders are ignited by means of external ignition at an interval of 180°CA.

For engines in which the cylinders are operated via auto-ignition, method variants may be advantageous in which auto-ignition of the cylinders is initiated at an interval of 180°CA.

During partial shutdown, the two cylinders of the second group may be switched off when the load falls below a pre-definable load $T_{down}$, and switched on when the load rises above a pre-definable load $T_{up}$.

Here the pre-definable load $T_{down}$ and/or $T_{up}$ may be dependent on the rotation speed n of the engine. A partial shutdown method may further comprise cutting off the fuel supply of a switched-off cylinder and/or deactivating the external ignition of a switched-off cylinder.

Figure 5:
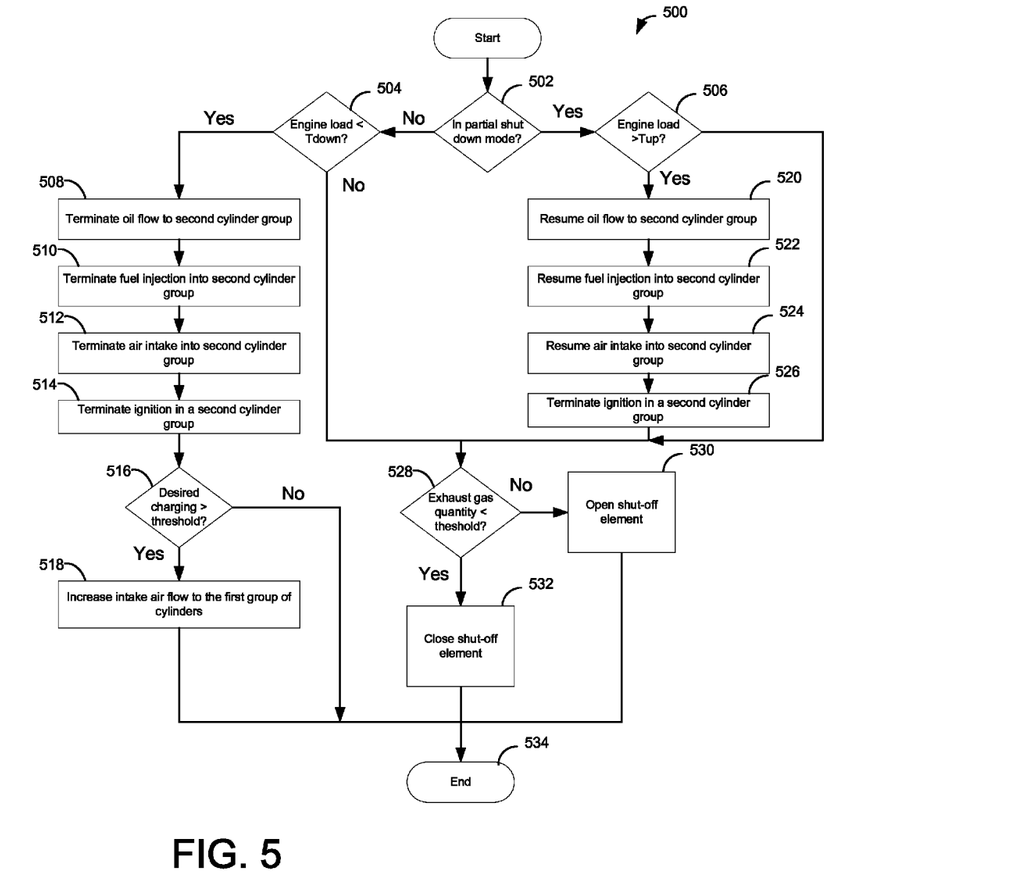
FIG. 5 is a flowchart of an example operating method.

An example operating method is depicted in FIG. 5. At 502 it may be determined if the engine is operating in partial shutdown mode, partial shutdown mode operation may be determined if the engine load is below a threshold $T_{up}$ or $T_{down}$ and/or if one or more of the cylinders is not in current operation. If the engine is not operating in shutdown mode it may be determined if the presiding engine load is below a predetermined threshold $T_{down}$. Predetermined threshold $T_{down}$ may be determined by any suitable method and may be responsive to the presiding rotational speed of the engine or other operating conditions such as engine temperature or fuel level.

If the engine is found to be operating at a load below a threshold $T_{down}$ at 502, a partial shutdown may be initiated. This may include terminating the flow of oil in a spray cooling system to one or more engine cylinders. In an embodiment this may include terminating oil flow to a second cylinder group by closing an oil shut off element.

A partial shutdown method may further comprise terminating fuel injection into one or more cylinders, the one or more cylinders may be the cylinders of a second cylinder group. At 512 air intake into one or more cylinders that may comprise the second cylinder group may be terminated. Air intake may be terminated via a throttle valve of a partially combined intake line or individual valves within the intake lines of the cylinders. At 514 ignition of the cylinders may be terminated, in spark ignition engines this may comprise terminating the actuation of a spark plug. In other embodiments ignition may be terminated by terminating fuel injection at 510.

In turbocharged embodiments the method may continue to 516 where it may be determined if the charging is greater than a threshold. The threshold may correspond to an amount of charging achievable via activation of a turbocharger. If the desired charging is found to be above a threshold at 516, an amount of intake air into the cylinders may be increased. An amount of intake air may refer to an amount of intake air delivered to the active cylinders which may refer to the cylinders in a first group. Therefore a total amount of intake air may not be increased from an amount of intake air prior to partial shutdown initiation. An amount of exhaust air delivered to a turbine within the exhaust stream of the active cylinders may be increased via the increase of intake air at 518.

Returning to 502 of method 500, if it is determined that the engine is currently operating in partial shutdown mode at 502 it may be determined if the presiding engine load is greater than a predetermined threshold $T_{up}$. If the engine load is found to be greater than threshold $T_{up}$, the method may be initiated to return the engine to full cylinder operation. At 520, oil flow to one or more engine cylinders may resume. This may include opening a shut-off element within an oil supply line that may be operatively located between a first cylinder group and a second cylinder group. At 522 fuel delivery to one or more cylinders may resume, the cylinders may be the shut-off cylinders of a second cylinder group. At 524, air intake to one or more cylinders, which may be of a second cylinder group, may be resumed. Air intake to the cylinders of this group may be controlled by a throttle in a combined intake pipe of a second cylinder group or by individual intake valves. At 526 ignition within the cylinders of the shut-off group may be initiated, ignition initiation may be subject to ignition timing determined by one or more controllers and may be sequentially determined using any of the aforementioned methods.

If the engine is operating in partial shutdown mode either via previous shutdown or due to shutdown method initiation at 506, the method may continue to 528 where it may be determined if the quantity of exhaust gas being delivered to a turbocharger is below a threshold. The step at 528 may be initiated in systems having a partially integrated exhaust manifold wherein the cylinders of a first group are coupled to a first partially combined exhaust line and the cylinders of the second cylinder group are connected to a second partially combined exhaust line and the first and second partially combined exhaust lines are coupled downstream of one or more turbines, such as in the system depicted in FIG. 4.

Here the first and second partially combined exhaust lines may be connected to each other via a connecting line upstream of the combined exhaust line. The connecting line may include a shut of element located therein wherein first and second partially combined exhaust lines are fluidically coupled and decoupled when the shut-off element is in the on position and off position respectively. If the quantity of exhaust gas is below a threshold at 528, the shut-off element may be moved to the closed position at 532, if the element is already in the closed position than it may remain in the closed position such that the first and second partially combined exhaust lines remain insolated upstream of a turbine. If the quantity of exhaust gas is above a threshold at 528, than the shut off element may remain open or be moved to the open position such that the first and second partially combined exhaust lines are substantially coupled upstream of a turbine. The method may end at 534 and may repeat in response to operating conditions, in rapid succession, or at predetermined time intervals.

In an uncharged engine embodiment, an exhaust gas quantity may correlate approximately to the rotation speed and/or the load of the engine and may be dependent on the load control used in the individual case. For a traditional petrol engine with quantity regulation, the exhaust gas quantity may rise as the load increases even at a constant rotation speed. Alternately, the exhaust gas quantity in traditional diesel engines with quality regulation may be dependent on the rotation speed and not load. This is because on load change and at a constant rotation speed the mixture composition may vary but the mixture quantity may be static.

In an engine charged by means of exhaust turbocharging, it should be taken into account that the boost pressure on the intake side may change with the load and/or rotation speed and may thus have an influence on the exhaust gas quantity. Consequently, the relationships outlined in simplified form above between the exhaust gas quantity and load or rotation speed do not then apply in this general form.

Therefore it can be advantageous with regard to partial shutdown to shut down on the basis of exhaust gas quantity and not load. If the exhaust gas quantity falls below a pre-definable exhaust gas quantity, partial shutdown occurs.

To this extent method variants may be advantageous, as part of the partial shutdown method, for the cylinders of the second group to be switched off when the exhaust gas quantity falls below a pre-definable quantity, and switched on when the exhaust gas quantity rises above a pre-definable quantity.

In embodiments wherein a variably controllable oil pump is used as a pump for delivery of the engine oil and on partial shutdown, the spray oil cooling of the two cylinders which are switched off load-dependently may be switched off by closing the supply line. Alternately, the oil quantity delivered by means of the oil pump may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
turning off a second cylinder group in response to engine load falling below a first threshold, the second cylinder group including a first outer most cylinder and its immediately adjacent cylinder;
turning on the second cylinder group in response to engine load raising above a second threshold; and
operating a first cylinder group constantly throughout engine operation; the first cylinder group including a second outer most cylinder and its immediately adjacent cylinder.

2. The engine method of claim 1, wherein turning off the second cylinder group includes terminating or reducing oil flow, fuel injection, intake airflow, ignition, or some combination thereof to the second cylinder group; and turning on the second cylinder group includes initiating or increasing oil flow, fuel injection, intake airflow, ignition, or some combination thereof to the second cylinder group.

3. The engine method of claim 1, further comprising increasing a mass of air to the first cylinder group when the second cylinder group is turned off.

4. The engine method of claim 1, further comprising exhausting gas from the first cylinder group into a first combined exhaust pipe that is separate from a second combined exhaust pipe; and exhausting gas from the second cylinder group into the second combined exhaust pipe.

5. The engine method of claim 4, further comprising combining the exhaust gas from the cylinders of the first cylinder group within an integrated exhaust manifold; and combining the exhaust gas from the cylinders of the second cylinder group within an integrated exhaust manifold.

6. The engine method of claim 4, further comprising compressing intake air for the first cylinder group via a first compressor mechanically coupled to a first exhaust turbine fluidically coupled to the first combined exhaust pipe; and compressing intake air for the second cylinder group via a second compressor mechanically coupled to a second exhaust turbine fluidically coupled to the second combined exhaust pipe.

7. The engine method of claim 6, further comprising fluidically coupling the first combined exhaust pipe to the second combined exhaust pipe upstream of the first and second turbines by opening a shut-off element in a connecting pipe and in response to an exhaust gas quantity raising above a threshold; and fluidically decoupling the first combined exhaust pipe and the second combined exhaust pipe upstream of the first and second turbines by closing a shut off element in the connecting pipe in response to the exhaust gas quantity falling below a threshold.

8. The engine method of claim 1, further comprising igniting the cylinders of the first cylinder group at a separation of 360CA and igniting the cylinders of the second cylinder group at a separation of 360CA, wherein the cylinders of the first cylinder group are ignited at a separation of 180CA from the cylinders of the second group.

* * * * *